Sept. 11, 1928.  C. SCHENCK ET AL  1,683,700
METAL WHEEL FOR ELASTIC TIRES
Filed June 17, 1920
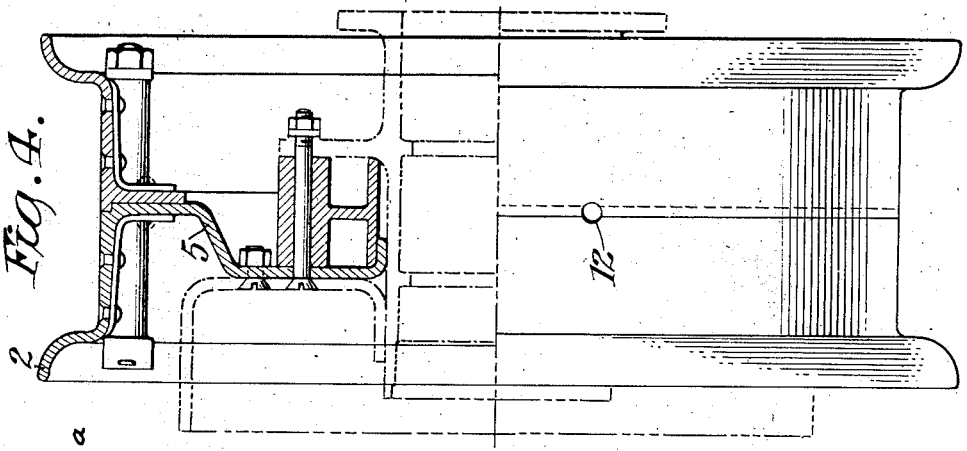
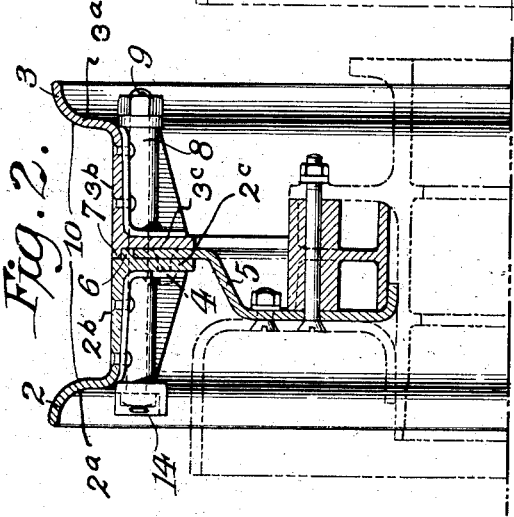
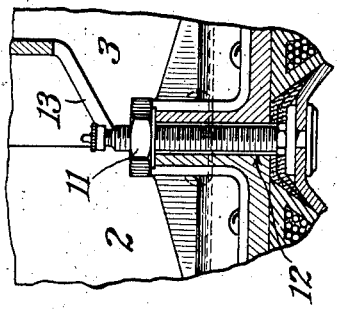
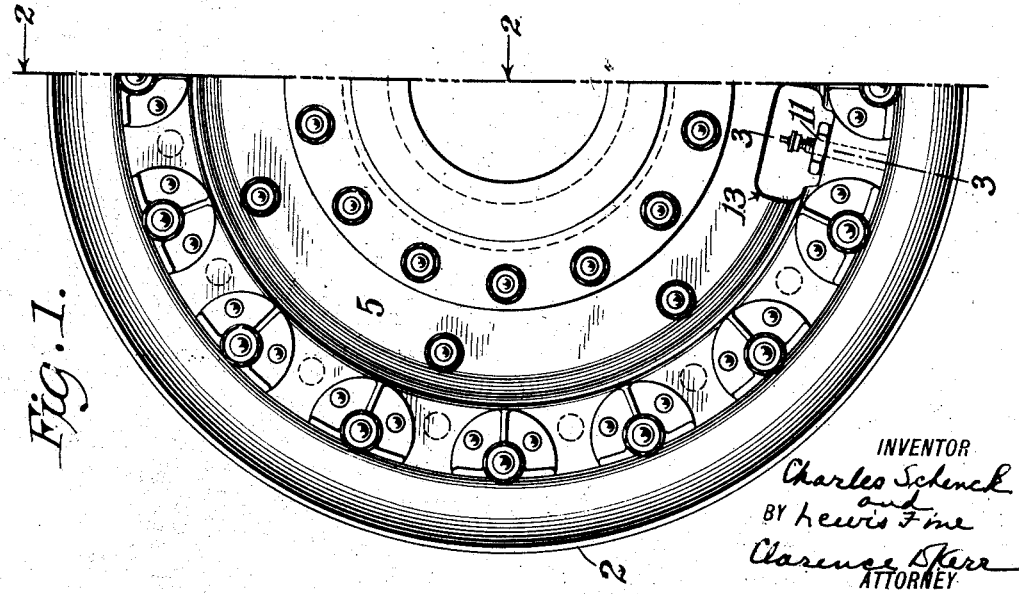
INVENTOR
Charles Schenck
Lewis Fine
BY
Clarence Kerr
ATTORNEY Patented Sept. 11, 1928.

1,683,700

UNITED STATES PATENT OFFICE.

CHARLES SCHENCK AND LEWIS FINE, OF BETHLEHEM, PENNSYLVANIA, ASSIGNORS TO BETHLEHEM STEEL COMPANY, OF BETHLEHEM, PENNSYLVANIA, A CORPORATION OF PENNSYLVANIA.

METAL WHEEL FOR ELASTIC TIRES.

Application filed June 17, 1920. Serial No. 389,757.

Fig. 1 is a partial elevation of a metal wheel embodying our invention; Fig. 2 is a section thereof on line 2—2 of Fig. 1; Fig. 3 is a section on line 3—3 of Fig. 1; and Fig. 4 is an elevation partly in section showing a modified form of our invention.

Our invention relates to a wheel construction peculiarly suitable for the reception of elastic tires, the construction consisting of a hub, a web portion, and a rim secured directly to the periphery of the web portion. The rim is made in complementary annular portions, one of which is fixed to the web portion while the other is detachable, whereby a tire may be readily mounted and demounted. This arrangement of rim is peculiarly suitable for pneumatic tires for the reason that it is not necessary to force the inner tube over an outwardly-extending flange part of the rim. Our invention also consists in the arrangement and construction of parts, which we shall hereinafter describe and claim.

Referring to the preferred form of our invention shown in Figs. 1, 2 and 3, we have a rim indicated as being made in two annular portions 2 and 3, the annular portion 2 being fixed to the web portion 5 of the wheel while the annular rim portion 3 is detachable.

The annular rim portions 2 and 3 are, respectively, provided with outwardly-extending flange parts 2$^a$ and 3$^a$, with base parts 2$^b$ and 3$^b$ and with inwardly-extending flange parts 2$^c$ and 3$^c$, the flange parts 2$^c$ being secured to the web portion 5 by any suitable means, as, for example, by rivets 4.

The base part 2$^b$ has a laterally-extending annular flange or shoulder 6 which is lapped by a complementary laterally-extending flange or shoulder 7 on the base part 3$^b$. The web portion 5 is engaged peripherally by the flange 6, whereby the rivets 4 are relieved of vertical shearing stresses.

Each rim portion has riveted or otherwise secured upon its inner face a plurality of metal sleeves 8 arranged as close to the rim as is practicable and having bearings for the heads and nuts of the bolts 9. The sleeves 8 act to reinforce the rim, and because of their closeness to the rim, the moments of forces applied laterally by a tire to the rim with respect to the axes of the bolts is minimized, whereby stresses in the bolts 9 are lessened. Furthermore, by providing sleeves on the base part 3$^b$ extending to the outer edge thereof, it is possible to have the nuts for the bolts 9 disposed beyond the base of the tire channel, whereby, as the nuts may extend beyond the inner surface of the rim and laterally of the latter, bolts of suitable size may be used and such bolts may be located quite near to the inner surface of the rim. In addition, the arrangement of the sleeves to extend approximately for the full width of the rim at the base of the tire seating channel 10 renders the bolt heads and nuts convenient of access.

The valve opening 11 is centered approximately on the line of division of the two parts of the rim, each of which has a semi-circular complementary recess 12 for the valve, while the web 5 is cut away at 13 to prevent interference therewith.

In putting on or replacing a tire, the nuts on the bolts 9 are removed and the rim portion 3 and the sleeves 8 attached thereto are removed bodily. When the tire has been put in place in the tire channel 10 the rim portion 3 is restored to its original position with the shoulder 7 resting upon and supported by the shoulder 6, and the sleeves 8 attached to the part 3 are slid over the bolts 9 protruding from the corresponding sleeves 8 attached to the part 2. The nuts are then applied, thus completing the assembly of the wheel.

It is not necessary to remove the bolts 9 during the replacement of the tire and these may be held in position by means of the cotter keys 14.

It will be seen that the arrangement that we have described not only provides a form of rim which may be conveniently assembled and permits the easy removal or replacement of a tire, but by reason of the interlock between the rim parts it provides a structure which relieves the securing bolts from strain, inasmuch as the shearing strain is taken up directly in the center of the wheel by the complementary shoulders 6 and 7.

In Fig. 4 we have shown a modified form of our device, in which the rim 2 is made integral with the web portions 5 of the wheel.

The terms and expressions which we have employed are used as terms of description and not limitation, and we have no intention, in the use of such terms and expressions, of excluding any mechanical equivalents of the features shown and described, or portions thereof, but recognize that various structural modifications are possible within the scope of the invention claimed.

What we claim is:

1. In a metal wheel, the combination of a web portion, a fixed annular rim portion having base and outwardly-extending flange parts and the base part being secured directly to the web portion, a detachable rim portion complementary to the fixed rim portion and having base and outwardly-extending flange parts, the outwardly-extending flange parts of said rim portions forming a tire-receiving channel, means secured to the inner faces of the base parts of said rim portions to provide bolt-receiving openings and said means secured to the base part of the detachable rim portion providing openings extending substantially to the outer edge of the latter base part, bolts extending through said openings with their threaded ends protruding from the openings in the detachable rim portion, nuts engaging the threaded ends of said bolts for holding the rim portions together, said base parts having portions which overlap circumferentially for relieving the bolts of vertical shearing stresses.

2. In a metal wheel, the combination of a web portion, a fixed annular rim portion having base and outwardly-extending flange parts, means for securing the fixed annular rim portion to the web portion, the base part of said fixed annular rim portion having an annular shoulder for peripherally engaging the web portion in order to relieve the securing means of vertical shearing stresses, a detachable rim portion complementary to the fixed rim portion and having base and outwardly-extending flange parts, the outwardly-extending flange parts of said rim portions forming a tire-receiving channel, and bolts cooperating with the base parts for securing the detachable rim portion in place with respect to the fixed rim portion, said base parts having portions which overlap circumferentially for relieving the bolts of vertical shearing stresses.

3. In a metal wheel, the combination of a web portion, a fixed annular rim portion having base and outwardly and inwardly-extending flange parts, means for securing the inwardly-extending flange part laterally of the web portion, the base part of said fixed annular rim portion having an annular flange or shoulder for peripherally engaging the web portion in order to relieve the securing means of vertical shearing stresses, a detachable rim portion complementary to the fixed rim portion and having base and outwardly and inwardly-extending flange parts, said inwardly-extending flange part adapted to engage the side of the web portion opposed to the side engaged by the first inwardly-extending flange part and to engage the outer edge of said shoulder or flange carried by the fixed rim portion, the base part of the detachable rim portion having an annular shoulder or flange adapted to lap the annular shoulder or flange of the fixed rim portion, the outwardly-extending flange parts of the rim portions forming a tire-receiving channel, means secured to the inner faces of the base parts of said rim portions to provide bolt-receiving openings and said means secured to the base part of the detachable rim portion providing openings extending substantially to the outer edge of the latter base part, bolts extending through said openings with threaded ends protruding from the openings in the detachable rim portion, and nuts engaging the threaded ends of said bolts outwardly of the outer edge of the base part of the detachable rim portion.

CHARLES SCHENCK.
LEWIS FINE.